Nov. 11, 1924.
G. W. WOODWARD
1,515,236
GEAR SHIFTING MECHANISM
Filed Nov. 19, 1921
7 Sheets—Sheet 1
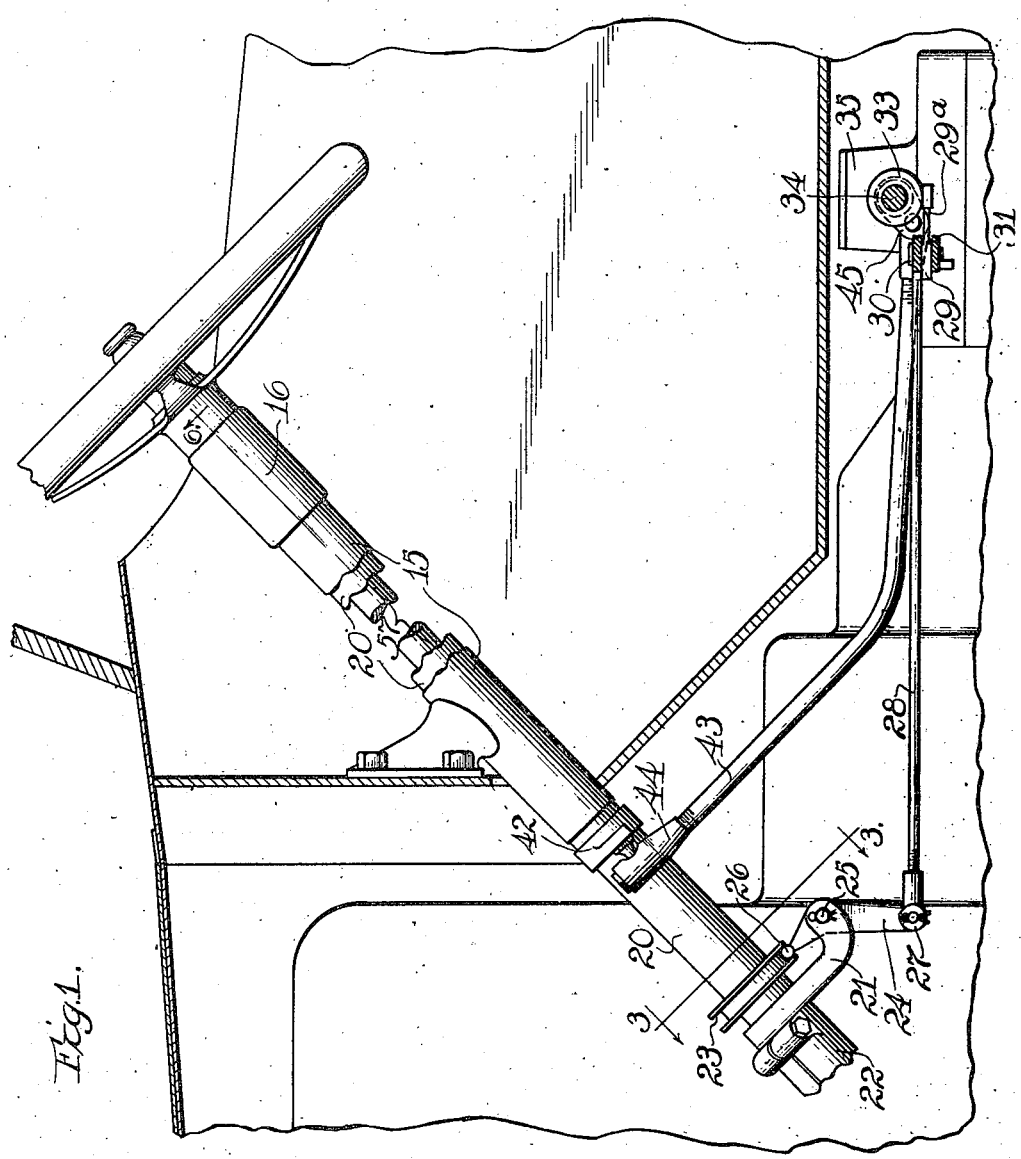
Witness
Arthur C. Wright.
Inventor;
Garrett W. Woodward,
By Dyrenforth, Lee, Chritton & Wiles,
Attorneys.

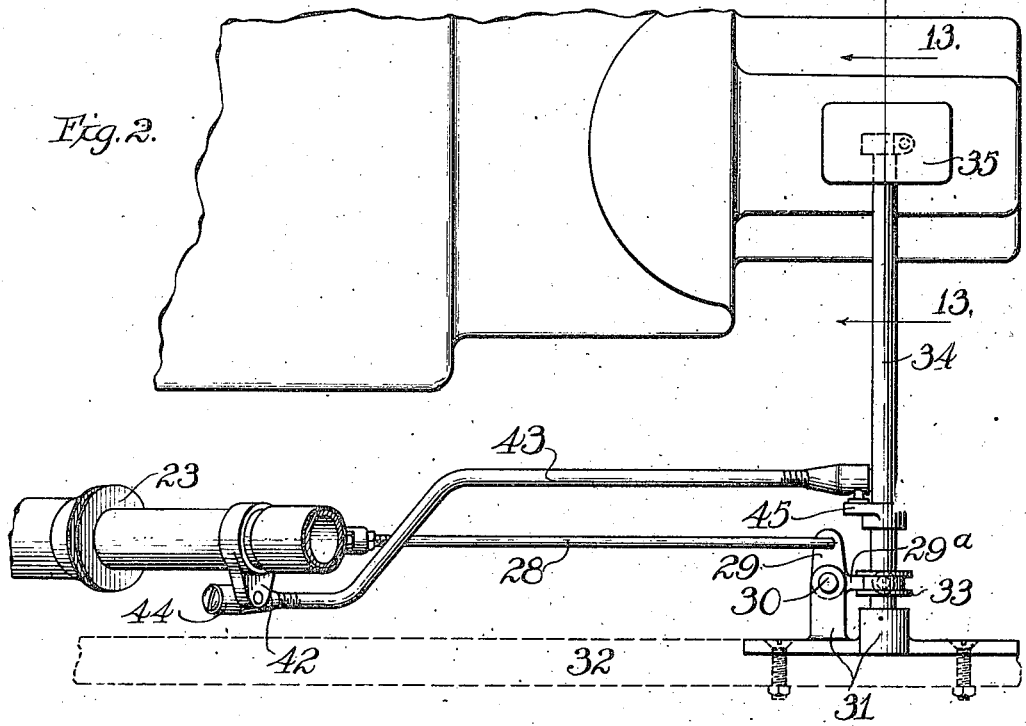
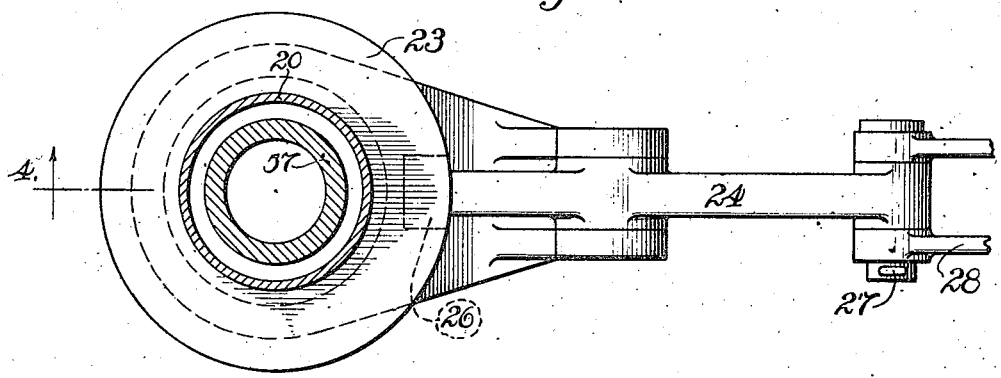

Nov. 11, 1924.	1,515,236
G. W. WOODWARD
GEAR SHIFTING MECHANISM
Filed Nov. 19, 1921	7 Sheets-Sheet 3
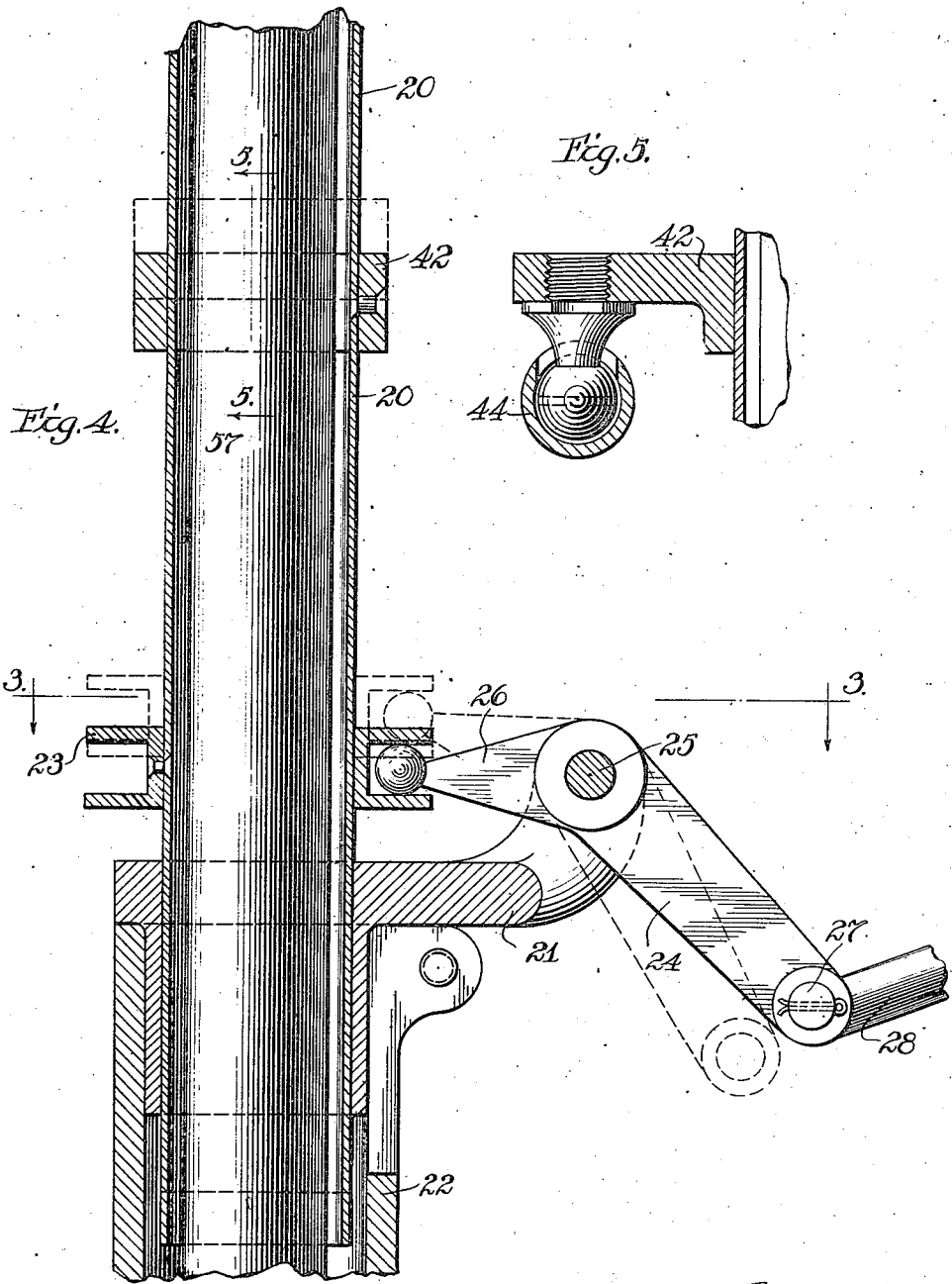

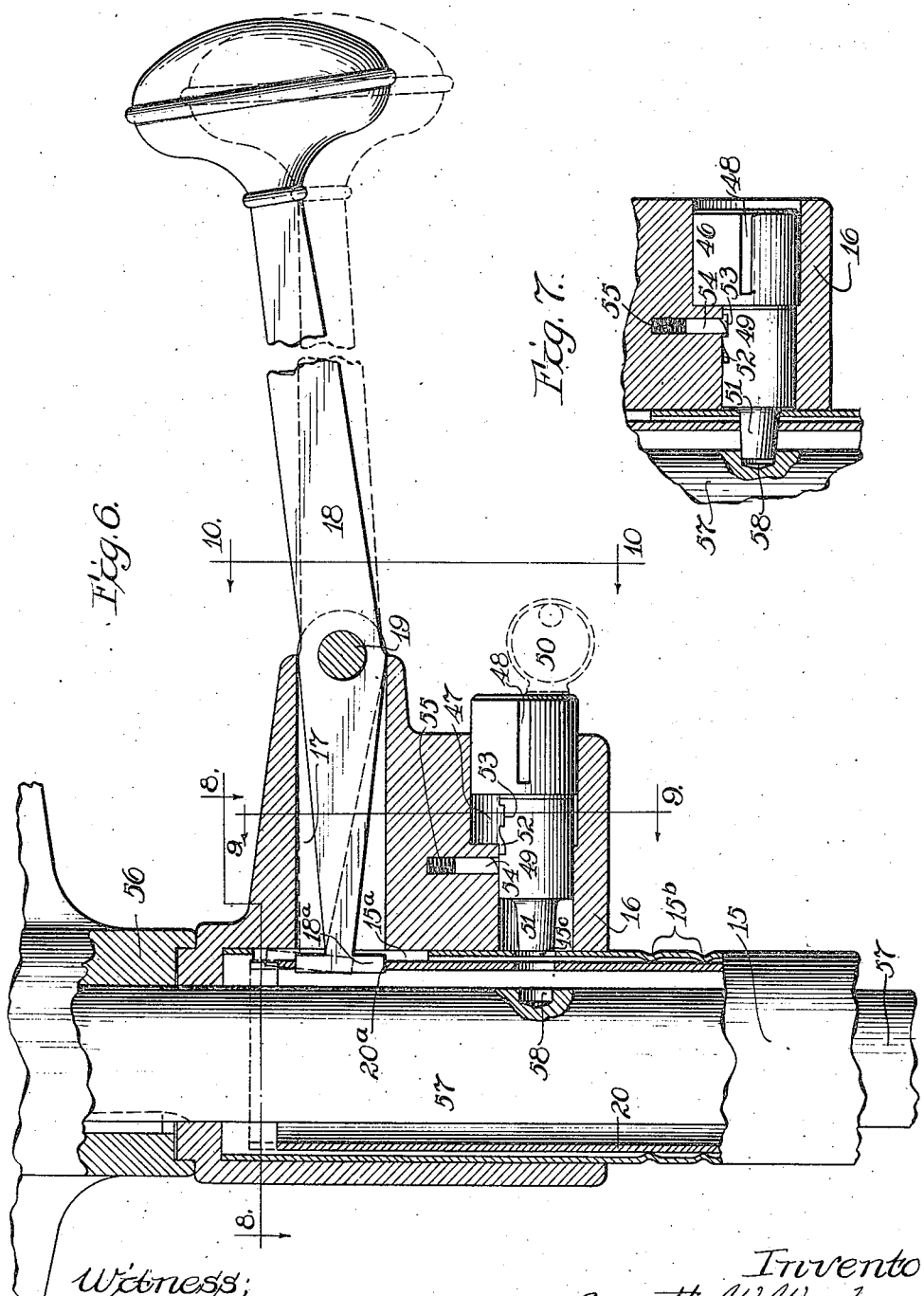

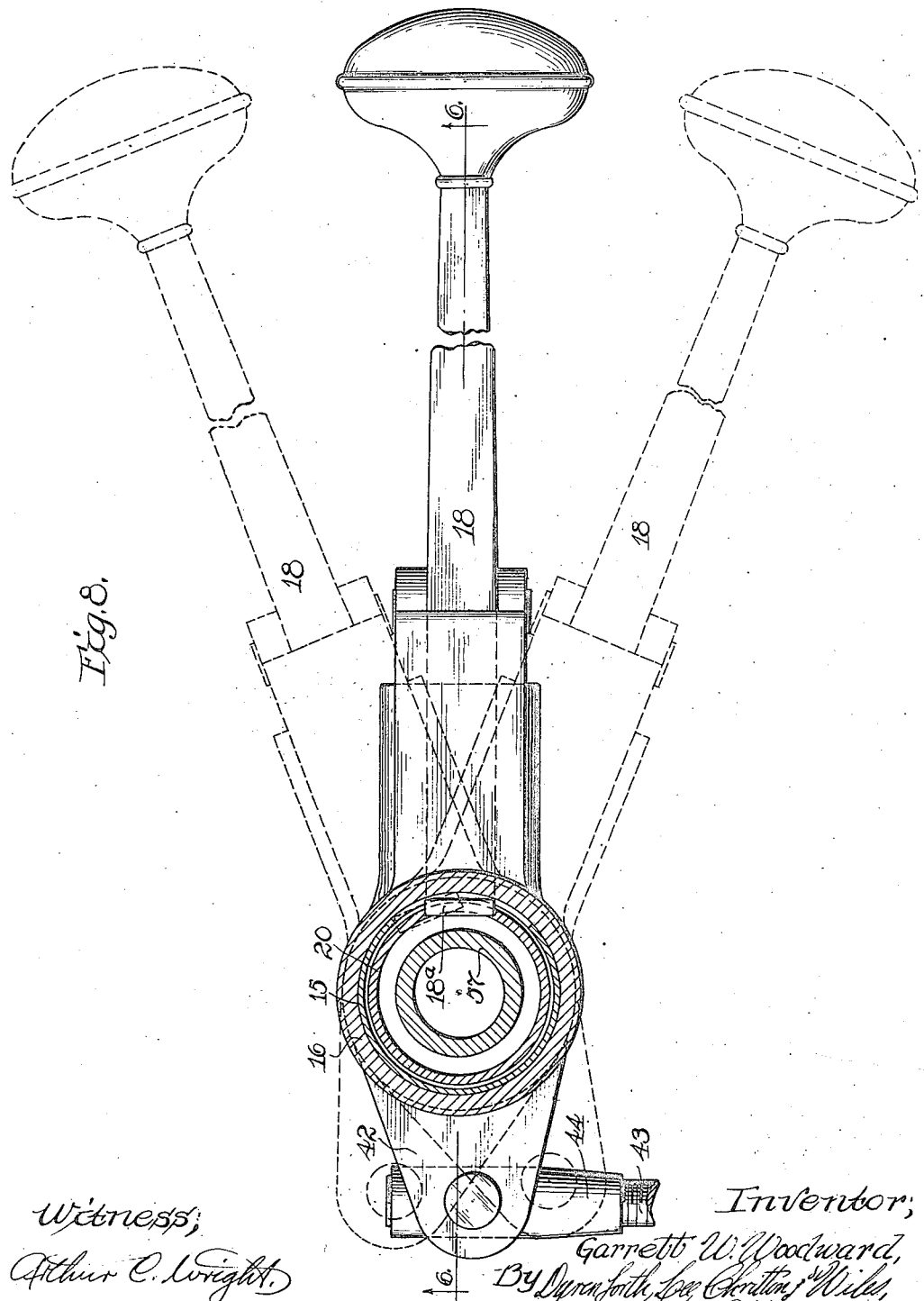

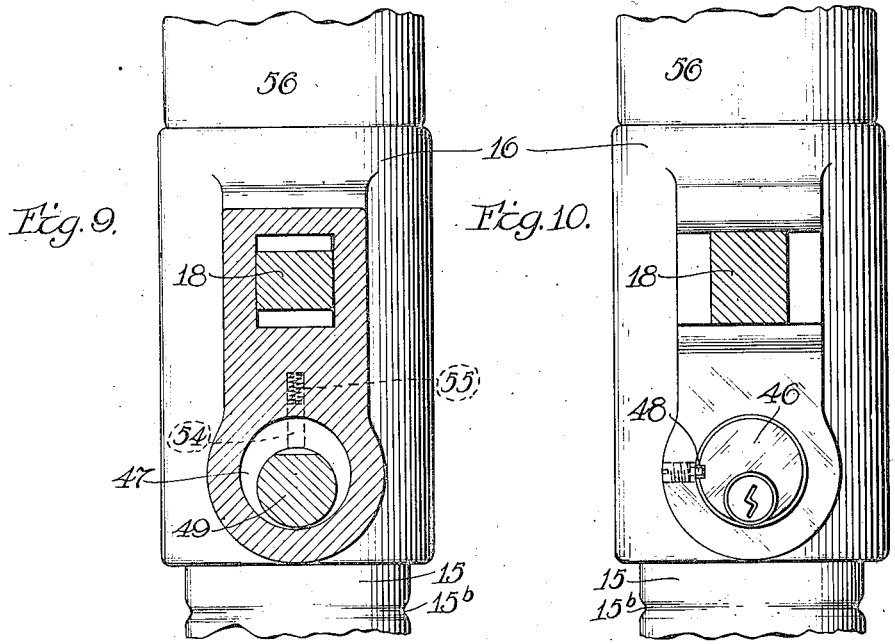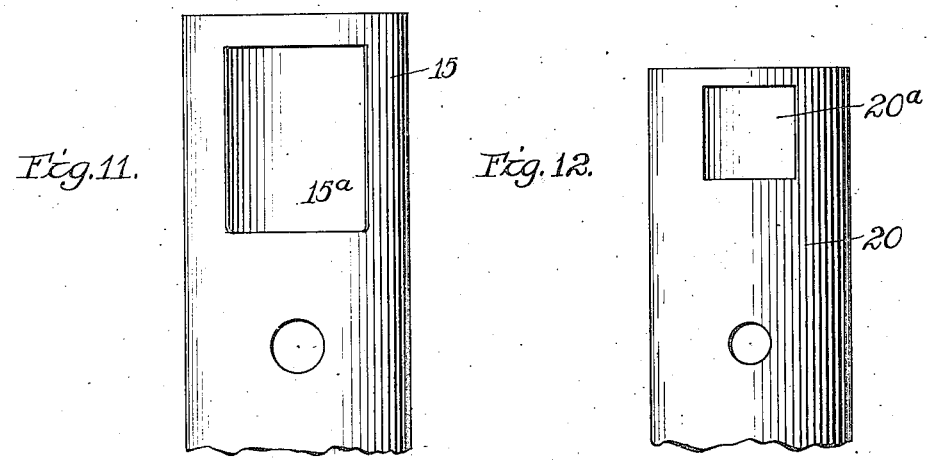

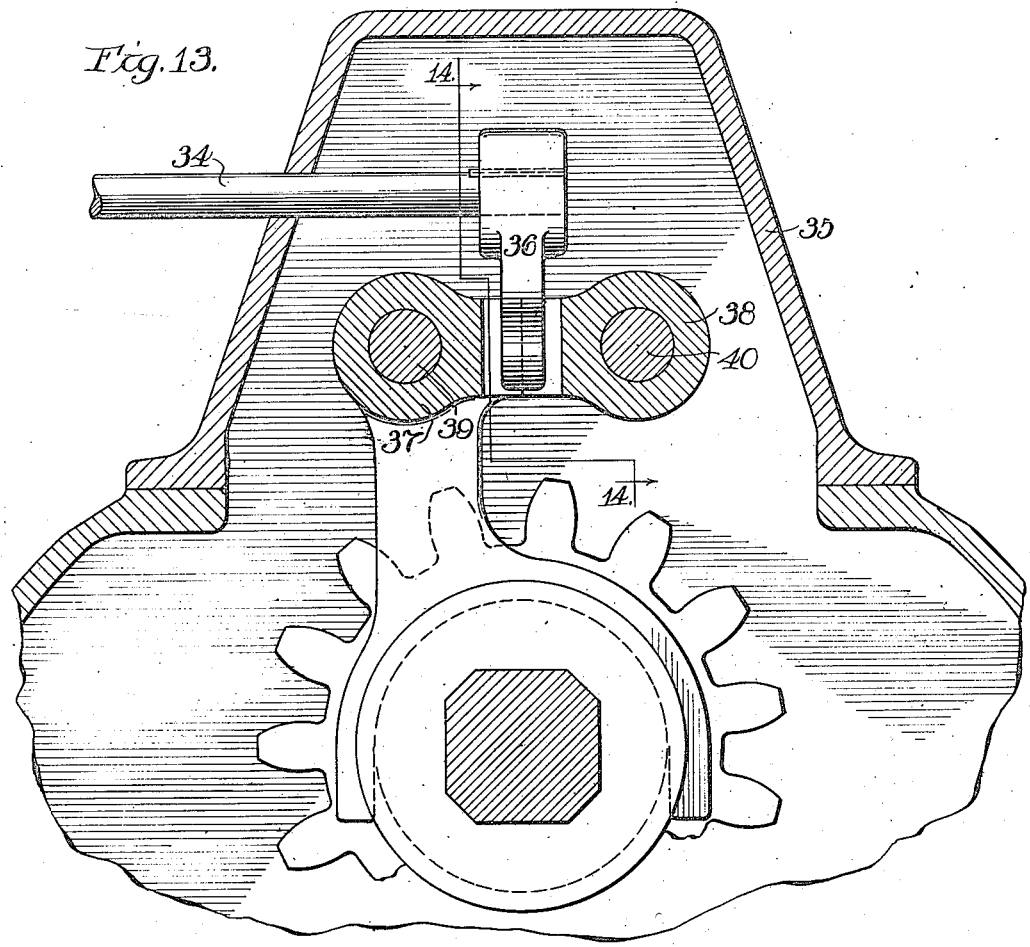
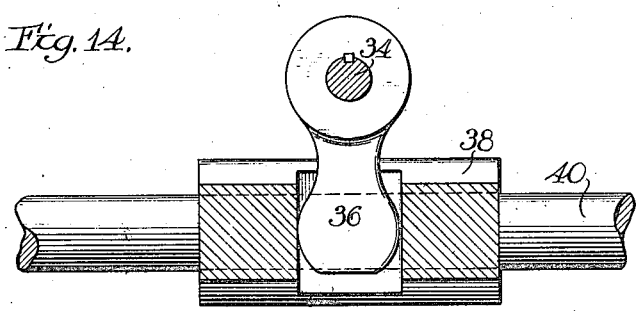

Patented Nov. 11, 1924.

1,515,236

UNITED STATES PATENT OFFICE.

GARRETT W. WOODWARD, OF CHICAGO, ILLINOIS, ASSIGNOR TO WOODWARD AUTO-MATIC CONTROL CORPORATION, OF CHICAGO, ILLINOIS, A CORPORATION OF ILLINOIS.

GEAR-SHIFTING MECHANISM.

Application filed November 19, 1921. Serial No. 516,350.

*To all whom it may concern:*

Be it known that I, GARRETT W. WOODWARD, a citizen of the United States, residing at 5056 Washington Boulevard, Chicago, in the county of Cook and State of Illinois, have invented a new and useful Improvement in Gear-Shifting Mechanism, of which the following is a specification.

This invention relates to shifting mechanism for automobile transmission and the like and is fully described in the following specification and shown in the accompanying drawings, in which:

Figure 1 is a partial vertical longitudinal section through an automobile showing the mechanism;

Fig. 2 is a partial horizontal plan view of the same;

Fig. 3 is a partial section on the line 3 of Fig. 1, enlarged;

Fig. 4 is a longitudinal section on the line 4 of Fig. 3;

Fig. 5 is a partial section on the line 5 of Fig. 4;

Fig. 6 is a partial longitudinal section on the line 6 of Figs. 1 and 8, showing the locking bolt withdrawn;

Fig. 7 is a similar view of the locking bolt showing it in position to lock both the gear shifting mechanism and the steering wheel;

Fig. 8 is a partial section on the line 8—8 of Fig. 6;

Figs. 9 and 10 are sections on the lines 9 and 10 respectively of Fig. 6;

Fig. 11 is an illustration of the upper end of the casing of the steering column;

Fig. 12 is a similar view of the upper end of a sleeve lying therein which forms a part of the gear shifting mechanism;

Fig. 13 is a partial vertical section on the line 13 of Fig. 2; and

Fig. 14 is a partial vertical section on the broken line 14 of Fig. 13.

The embodiment of the invention, as illustrated, is applied to the steering column of an automobile having an outer casing 15 which is rigidly secured to the automobile body as shown in Figs. 1 and 2. This construction is similar in a general way to that shown and described in my pending application on gear shifting mechanism Serial No. 463,189.

Referring now to Fig. 6 the block 16 is journalled upon the upper end of the casing 15 and has a lateral opening 17 in which is hingedly mounted a gear shift lever 18 upon the pin 19. The inner end of the gear shift lever 18 terminates in a nob 18ª which passes through an opening 15ª in the casing 15 as shown in Figs. 6 and 11 and engages an opening 20ª in the sleeve 20 as shown in Figs. 6 and 12. The head 18ª substantially fits the opening 20ª so that any up-and-down movement of the lever 18 as shown in dotted lines in Fig. 6 gives a corresponding movement to the sleeve 20 in the reverse direction. A movement of the lever 18 about the axis of the steering column will likewise be transmitted to the sleeve 20.

The sleeve 20 as shown in Figs. 1 and 4 extends through the lower end of the casing 15 and is journalled in the bracket 21 which is secured to the lower end of the steering column 22, which in turn is secured to the automobile chassis.

A groove collar 23 is secured to the sleeve 20. A bell-crank 24 is hingedly mounted on the bracket 21 by means of a pin 25 and has a rounded end 26 which engages the groove in the collar 23. The opposite end of the bell-crank is connected by means of a pin 27 to the rod 28 as shown in Fig. 1. The opposite end of the rod 28 is hingedly connected to a bell-crank 29 which is pivotally mounted by means of a pin 30 upon the bracket 31 which in turn is secured to the automobile frame member 32.

The opposite end of the bell-crank 29ª engages the groove collar 33 which is secured on the shaft 34. One end of this shaft is journalled in the bracket 31 while the other end is journalled in the transmission cover 35 as shown in Figs. 2 and 13. The latter end of the shaft carries a lever 36 which is slidable on endwise movement of the shaft 34 into engagement with either the blocks 37 or 38 which are mounted upon the guides 39 and 40 respectively.

It will be understood from the foregoing that when the gear shifting lever 18 is in the neutral position as shown in full lines in Fig. 6, the lever 36 will be in neutral position as shown in full lines in Fig. 13 in which position it engages both of the blocks 37 and 38 thereby preventing either one from being shifted. These rods are moved from the neutral position to an operative position by first shifting the shaft 34 endwise by the mechanism which has just been described until the lever 36 is in engagement with either the block 37 or the block 38 and out of engagement with the other block and then turning the shaft 34 either forward or back so as to force the block so engaged forward or back, thereby shifting the gears of the transmission into one of the operative positions. The mechanism for turning the shaft 34 for this purpose will now be explained.

The sleeve 20, as has been previously stated, is rotatable in the casing 15, the upper end of the sleeve being journalled in portions 15$^b$ of the casing 15. A lever 42 secured to the sleeve 20 is shown in Fig. 5 which is pivotally connected to the rod 43 by means of a ball and socket joint 44. The opposite end of this rod is connected in a similar manner to the lever 45 which is secured on the shaft 34.

It will thus be seen that in order to shift the gears it is necessary first to move the lever 18 either up or down in a plane passing through the axis of the steering column and then to move the lever 18 about the axis of the steering column. The first movement corresponds to moving the steering lever to one side in the case of a standard selective starting gear type of transmission. The second movement of the lever 18 corresponds to the movement of the standard gear shift lever forward or back to through the gears into mesh.

I have provided a means for locking the lever in the neutral position consisting of a lock body 46 slidable longitudinally in the opening 47 in the block 16 as shown in Fig. 6. This lock body is prevented from turning by means of a key slot 48. The lock body carries a plunger 49 which may be turned by means of a key 50 and which terminates at the inner end in a reduced and preferably tapered portion 51. Two shallow transverse slots 52 and 53 are formed in the side of the plunger and these fall immediately under a detent 54 which is pressed against the plunger by means of a spring 55.

When the key is withdrawn the slots 52 and 53 fall immediately under the plunger so that as the lock body 46 is passed inwardly, the detent 54 will engage the slot 52 and as the lock body is pressed in further the detent 54 will engage the slot 53.

Openings 15$^c$ and 20$^d$ are formed in front of the end of the member 51 and in registration therewith when the lever 18 is in neutral position.

The steering wheel 56 is keyed to the steering shaft 57 and an opening 58 is provided therein which may be turned into alignment with the tumbler 51 and the holes 15$^c$ and 20$^b$. It will thus be seen that by pushing in the tumbler 51 until the detent 54 engages the slot 52, the gear shift mechanism will be locked in neutral position and that upon a further movement of the tumbler 51 it will engage the opening 58 and lock also the steering wheel against movement. The tumbler may be removed by inserting the key and turning the lock and pulling outwardly on the tumbler.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all the novelty inherent in my invention as broadly as possible in view of the prior art.

What I claim as new, and desire to secure by Letters Patent, is:

1. In a motor vehicle, a transmission having selective sliding gear mechanism including two selectively movable members, a shaft, a finger on said shaft, said shaft being movable to cause said finger to selectively engage either of said members, a steering column, a steering shaft therein, a lever movably mounted thereon, means operatively connecting said lever and shaft for moving the shaft to cause the finger to engage one of the members, means operatively connecting said lever and shaft for causing said finger to move said member to shift a transmission gear upon movement of said lever, and means for locking said last mentioned means and said steering shaft against movement.

2. In a motor vehicle, a transmission having selective sliding gear mechanism including two selectively movable members, a shaft, a finger on said shaft, said shaft being movable to cause said finger to selectively engage either of said members, a steering column, a steering shaft therein, a lever movably mounted thereon, means operatively connecting said lever and shaft for moving the shaft to cause the finger to engage one of the members, means operatively connecting said lever and shaft for causing said finger to move said member to shift a transmission gear upon movement of said lever, and a locking bolt on said column movable on an initial movement to lock said last mentioned means against movement and on a further movement to lock said steering shaft against movement.

3. In a motor vehicle, a transmission having selective sliding gear mechanism, a steering column having a steering wheel, a lever mounted on said steering column and operably connected for selectively making the gear shifts in said transmission, means operable for locking said lever on an initial movement and for locking said steering wheel on a further movement of said means.

4. In a motor vehicle, a transmission having selective sliding gear mechanism, a steering column having a steering wheel, a lever mounted on said steering column and operably connected for selectively making the gear shifts in said transmission, a lock bolt operable for locking said lever on an initial movement and for locking said steering wheel on a further movement of said lock bolt.

5. In a motor vehicle, a transmission having selective sliding gear transmission, a steering column having a casing rigidly secured to the motor vehicle, a steering shaft rotatable within the casing, a gear shift member operably connected to the transmission gear shift mechanism, a lock bolt carried by said member, holes in said casing and said shaft in registration with said lock bolt and means for locking the bolt to said casing.

6. In a motor vehicle, a transmission having selective sliding gear transmission, a steering column having a casing rigidly secured to the motor vehicle, a steering shaft rotatable within the casing, a gear shift member operably connected to the transmission gear shift mechanism, a lock bolt carried by said member, holes in said casing and said shaft in registration with said lock bolt and means for selectively locking said bolt to said casing or to said casing and shaft.

GARRETT W. WOODWARD.